(12) United States Patent
Vanchev et al.

(10) Patent No.: US 11,057,769 B2
(45) Date of Patent: Jul. 6, 2021

(54) DETECTING UNAUTHORIZED ACCESS TO A WIRELESS NETWORK

(71) Applicant: AT&T Digital Life, Inc., Atlanta, GA (US)

(72) Inventors: Plamen Vanchev, Suwanee, GA (US); Bashar Abdul-Majeed, Norcross, GA (US)

(73) Assignee: AT&T Digital Life, Inc., Atlanta, GA (US)

(*) Notice: Subject to any disclaimer, the term of this patent is extended or adjusted under 35 U.S.C. 154(b) by 293 days.

(21) Appl. No.: 15/918,836

(22) Filed: Mar. 12, 2018

(65) Prior Publication Data

US 2019/0281461 A1 Sep. 12, 2019

(51) Int. Cl.
*H04W 12/08* (2021.01)
*H04L 29/06* (2006.01)

(52) U.S. Cl.
CPC ......... *H04W 12/08* (2013.01); *H04L 63/0876* (2013.01); *H04L 63/108* (2013.01); *H04L 63/1416* (2013.01)

(58) Field of Classification Search
CPC ............ H04W 12/08; H04W 12/1204; H04W 12/00502; H04W 12/00506; H04L 63/0876; H04L 63/108; H04L 63/1416
See application file for complete search history.

(56) References Cited

U.S. PATENT DOCUMENTS

| | | | |
|---|---|---|---|
| 6,393,484 B1 | 5/2002 | Massarani | |
| 7,228,429 B2 | 6/2007 | Monroe | |
| 8,060,939 B2 | 11/2011 | Lynn et al. | |
| 8,196,199 B2 | 6/2012 | Hrastar et al. | |
| 8,621,567 B2 | 12/2013 | Kleinsteiber | |
| 8,688,834 B2 | 4/2014 | Fujimoto | |
| 8,989,954 B1 | 3/2015 | Addepalli et al. | |

(Continued)

FOREIGN PATENT DOCUMENTS

| JP | 2002055895 | 2/2002 |
|---|---|---|
| WO | WO 2004070575 | 8/2004 |

(Continued)

OTHER PUBLICATIONS

Bastian Konings et al., "Channel Switch and quiet Attack: New DoS Attacks Exploiting the 802.11 Standard," Oct. 2009, pp. 13-21. (Year: 2009).*

(Continued)

*Primary Examiner* — Jahangir Kabir
*Assistant Examiner* — Canh Le
(74) *Attorney, Agent, or Firm* — Hartman & Citrin LLC

(57) ABSTRACT

Systems and methods detect a potential hacking attack by monitoring the number and timing of DELBA (Delete Block Acknowledgement) action frames. When the number and timing of the DELBA action frames correspond to an unauthorized access pattern, an unauthorized access is detected. The potential unauthorized access may be detected by an access point (AP) or by the AP and a backend system. When a potential unauthorized access is detected, the AP may remain in silent mode for a longer period of time and limit access to the network to only trusted devices. In addition, an alarm or other notification of the potential unauthorized access may be provided to a user or other designated contact.

10 Claims, 3 Drawing Sheets

(56) References Cited

U.S. PATENT DOCUMENTS

| | | | |
|---|---|---|---|
| 9,000,916 B2 | 4/2015 | Meeker et al. | |
| 9,147,337 B2 | 9/2015 | Cohn et al. | |
| 9,349,276 B2 | 5/2016 | Cohn et al. | |
| 9,363,675 B2 | 6/2016 | Chuang et al. | |
| 9,807,681 B2 | 10/2017 | Sahni | |
| 9,832,639 B2 | 11/2017 | Raman et al. | |
| 2003/0071724 A1 | 4/2003 | D'Amico | |
| 2005/0141495 A1* | 6/2005 | Lin | H04B 7/0617 370/389 |
| 2005/0213553 A1 | 9/2005 | Wang et al. | |
| 2006/0268886 A1* | 11/2006 | Sammour | H04W 28/18 370/394 |
| 2009/0254496 A1* | 10/2009 | Kanevsky | G06K 9/6226 706/12 |
| 2009/0290520 A1* | 11/2009 | Roberts | H04W 48/14 370/311 |
| 2009/0298475 A1* | 12/2009 | Czaja | H04W 48/04 455/412.2 |
| 2010/0157960 A1* | 6/2010 | Banerjee | H04L 67/1095 370/338 |
| 2010/0299725 A1* | 11/2010 | Yamada | H04L 1/1607 726/4 |
| 2014/0153416 A1* | 6/2014 | Brandes | H04L 1/1685 370/252 |
| 2016/0269445 A1 | 9/2016 | Dotterer, III et al. | |
| 2016/0316500 A1 | 10/2016 | Aliyar et al. | |
| 2016/0364927 A1 | 12/2016 | Barry et al. | |
| 2017/0094587 A1* | 3/2017 | Ding | H04L 67/141 |
| 2017/0272951 A1* | 9/2017 | Howard | G06F 21/606 |
| 2017/0289900 A1 | 10/2017 | Tchigevsky et al. | |
| 2017/0367130 A1* | 12/2017 | Tseng | H04L 63/101 |

FOREIGN PATENT DOCUMENTS

| | | |
|---|---|---|
| WO | WO2017114702 | 12/2016 |
| WO | WO 2017064560 | 4/2017 |
| WO | WO2017160549 | 9/2017 |

OTHER PUBLICATIONS

Chad D. Mano et al., "RIPSS: Rogue Identifying Packet Payload Slicer Detecting Unauthorized Wireless Hosts Through Network Traffic Conditioning," ACM May 2008, pp. 1-12 (Year: 2008).*

Aung et al., "Proposed Framework for Link Layer Attack Detection System in Wireless Network", University of Computer Studies, Mandalay.

Bazzi et al., "Mobile Wireless Devices, Virtualization and Power Saving", IPSJ SIG Technical Report 2011 Information Processing Society of Japan, Nov. 10, 2011.

Konings et al., "Channel Switch and Quiet attack: New DoS attacks exploiting the 802.11 standard", Institute of Media Informatics.

Modi et al., "A Survey of Intrusion Detection Techniques in Cloud", Centre for Cyber Security Sciences, 2013.

Saldana et al., "What to do with the Wi-Fi Wild West", Horizon 2020 European Union Funding for Research & Innovation, Dec. 2016.

Satam , "An Anomaly Behavior Analysis Intrusion Detection System for Wireless Networks", A Dissertation submitted to the Faculty of the Department of Electrical and Computer Engineering, 2015.

* cited by examiner

DETECTING UNAUTHORIZED ACCESS TO A WIRELESS NETWORK

FIELD OF THE INVENTION

This application relates to network security and in particular to detecting a potential unauthorized access to a wireless network by monitoring DELBA action frames.

BACKGROUND

Wifi technology is commonly used to provide wireless broadband service in a home or other environment. Devices and systems, including entertainment systems, may communicate with a wireless Access Point (AP) to access a Wifi network. Network security is a concern for Wifi networks. In some systems, network security is provided by having the AP maintain a list of trusted devices and allowing only those trusted devices access to the network.

An unauthorized device that is attempting to access the network, i.e., a hacking device, may be able to obtain security keys, such as WEP/WPZ/WPS keys and access the network or conduct other network-based attacks on wireless or Ethernet-based networks. When a Wifi network is hacked, it may expose information from a network customer or network provider or it may allow the hacker to control other devices on the network.

SUMMARY

Aspects of the invention provide systems and methods for detecting a potential hacking attack by monitoring the number and timing of DELBA (Delete Block Acknowledgement) action frames. When the number and timing of the DELBA action frames correspond to an unauthorized access pattern, an unauthorized access is detected. An unauthorized access pattern may specify a threshold number of DELBA action frames within a predetermined time interval or a pattern of DELBA action frames. The factors used to detect a potential unauthorized access, such as the number of DELBA action frames and the time interval, may be adaptive and may be adjusted as needed.

When a potential unauthorized access is detected, the wireless access point (AP) enters defensive mode. While in defensive mode, the AP may remain in silent mode for a longer period of time than normal and limit access to the network to only trusted devices. In addition, an alarm or other notification of the potential unauthorized access may be provided to a user or other designated contact.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

The features, aspects, and advantages of the present disclosure are better understood when the following Detailed Description is read with reference to the accompanying drawings.

DETAILED DESCRIPTION

A potential hacking attack may be identified by monitoring the number and timing of DELBA (Delete Block Acknowledgement) action frames to determine whether the DELBA action frames correspond to an unauthorized access pattern. An unauthorized access pattern may specify a threshold number of DELBA action frames within a predetermined time interval or a pattern of DELBA action frames. When the DELBA action frames match the unauthorized access pattern, a potential hacking attack is identified and a wireless access point (AP) enters a defensive mode. While in defensive mode, the AP may enter silent mode and optionally may limit access to the network to only trusted devices.

The AP may be configured to enter silent mode in response to detecting a DELBA event or a DELBA action frame when operating under normal conditions. When the AP enters silent mode under normal conditions, it may remain in silent mode for a default time period. In one example, the default time period is approximately 30 seconds to 1 minute. An AP may enter silent mode a few times a day under normal conditions. For example, heavy traffic conditions may cause the AP to enter silent mode.

When the DELBA action frames correspond to an unauthorized access pattern, then a potential hacking attack may be detected. The unauthorized access pattern may specify a threshold number of DELBA action frames detected within a time interval or another pattern that is indicative of a potential hacking attack. In one implementation, the AP or a wireless home router determines that conditions indicate a potential hacking attack. In another implementation, a wireless home cloud router or a backend system determines that conditions indicate a potential hacking attack.

Figure 1:
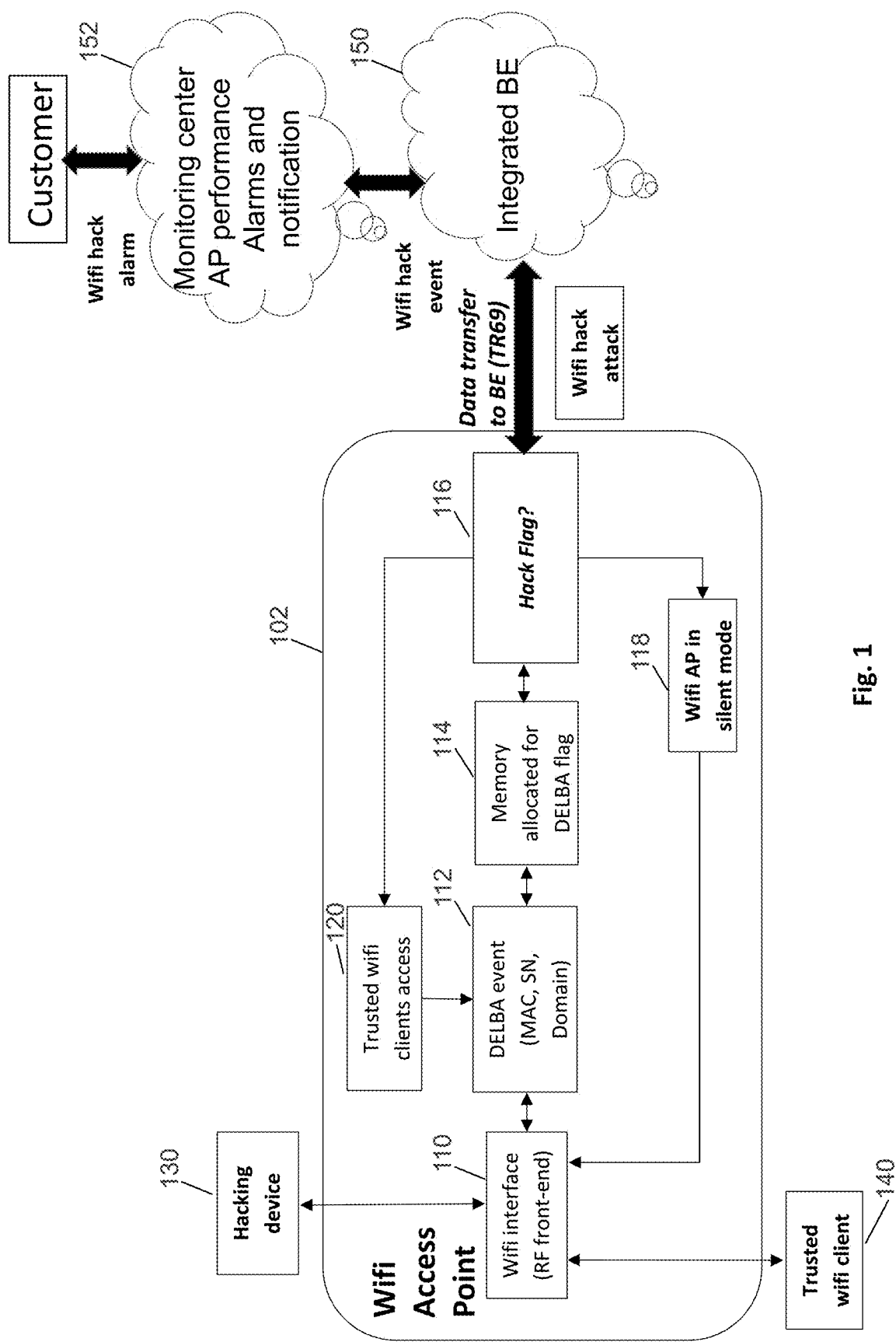
FIG. 1 is an block diagram illustrating exemplary operations of an AP and backend system when the AP is configured to detect a potential unauthorized access.

FIG. 1 illustrates a configuration where a wireless home router determines whether conditions indicate a potential hacking attack and if so, enters a defensive mode. In this example, the router is an AP. The AP 102 may be located in a home or other customer location and may be capable of communicating with devices 130, 140 and with backend system 150. In the example illustrated by FIG. 1, device 140 is a trusted Wifi client device and device 130 is a hacking device.

The blocks 110-120 within the AP 102 illustrate operations performed by the AP 102. Each block 110-120 may correspond to one or more components in the AP 102 and may be implemented in firmware, hardware, software, or any combination thereof. The AP 102 may include a Wifi interface or RF front end 110 for wirelessly communicating with devices, such as devices 130, 140, and providing the devices with access to the network. The AP 102 monitors communications received from the devices 130, 140. When the AP 102 detects a DELBA action frame in block 112, it sets a DELBA flag in block 114. It may also allocate memory for the DELBA flag in block 114, if needed. The AP 102 may maintain a counter of DELBA action frames or flags that is adjusted each time a DELBA action frame is detected. In block 116, the AP 102 determines whether the number or pattern of DELBA action frames indicates a potential unauthorized access.

In one example, the AP 102 may use a threshold of 3 DELBA action frames within a 15 minute time interval to identify a potential unauthorized access. If 3 or more DELBA action frame flags occur within 15 minutes, i.e., the AP 102 enters silent mode at least 3 times in 15 minutes, then a potential hacking attack is detected. A hack flag is set in block 116 and the AP 102 enters defensive mode. The number of DELBA action frames and/or the length of the time interval may be adjusted as additional data about the operation of the AP 102 or hacking behaviors are obtained.

In another example, a potential hacking attack may be detected when the AP 102 cycles between normal mode and silent mode according to a predetermined pattern, such as alternating between silent mode for 1 minute and then normal mode for 1 minute for a certain number of minutes or a certain number of times. The pattern may be selected so that it corresponds to the known or expected behavior of an AP 102 during a potential hacking attack. When the pattern is detected, the hack flag is set in block 116 and the AP 102 enters defensive mode. The pattern may be adjusted as additional data about the operation of the AP 102 or hacking behaviors are obtained.

While in defensive mode, the AP 102 enters silent mode in block 118 and remains in silent mode for a defensive time period. The AP 102 may remain in silent mode for a longer period of time while in defensive mode than when it is enters silent mode under normal conditions. In one exemplary implementation, the AP 102 remains in silent mode for 30 seconds when it enters silent mode under normal conditions and remains in silent mode for 1 minute when it enters silent mode while in defensive mode. Alternatively, the AP 102 may remain in silent mode for a period of time that is the same as or similar to the default time period. In another exemplary implementation, the AP 102 remains in silent mode for 1 minute when it enters silent mode under normal conditions and remains in silent mode for 1 minute when it enters silent mode while in in defensive mode.

In addition to entering silent mode, the AP 102 may also notify the backend system of the potential unauthorized access. In one example, the AP 102 sends a TR69 message to the backend system to notify the backend system of the potential unauthorized access. TR69 is an application layer protocol for remote management of customer-premises equipment (CPE), such as a router. Other protocols for communication between a remote device and a backend system may also be used. The backend system may communicate information about the potential unauthorized access to a monitoring center, may generate an alarm or other notification, may notify a customer or other contact associated with the AP 102, or take any other suitable action.

While the AP 102 is in defensive mode, it may not allow devices, such as devices 130, 140 access to the network. Alternatively, while the AP 102 is in defensive mode, it may allow only trusted devices access to the network. A trusted device may be recognized by the AP 102 by its MAC address. In one implementation, the AP 102 maintains a list of trusted MAC addresses. While the AP 102 is in defensive mode, the AP 102 may allow device 140 access to the network when the MAC address for device 140 is included on the list of trusted MAC addresses in block 120. If trusted devices are permitted to access the network during silent mode, the AP 102 continues to monitor DELBA action frames in block 112. The AP 102 may prevent device 130 from accessing the network when the MAC address for the device 130 is not included on the list of trusted MAC addresses. In some implementations, if a device with an untrusted MAC address tries to communicate with the AP 102 while the AP 102 is in defensive mode, the AP 102 may take additional action including, but not limited to, extending the defensive time period or sending a further message to the backend system. Once the AP 102 exits defensive mode, it exits silent mode and may communicate with devices 130, 140 regardless of whether they are recognized as trusted devices.

If the AP 102 does not detect a potential hacking attack in block 116, it enters silent mode in block 118, but does not enter defensive mode. It remains in silent mode for a default time period and then exits silent mode. After it exits silent mode, it may communicate with devices 130, 140.

Figure 2:
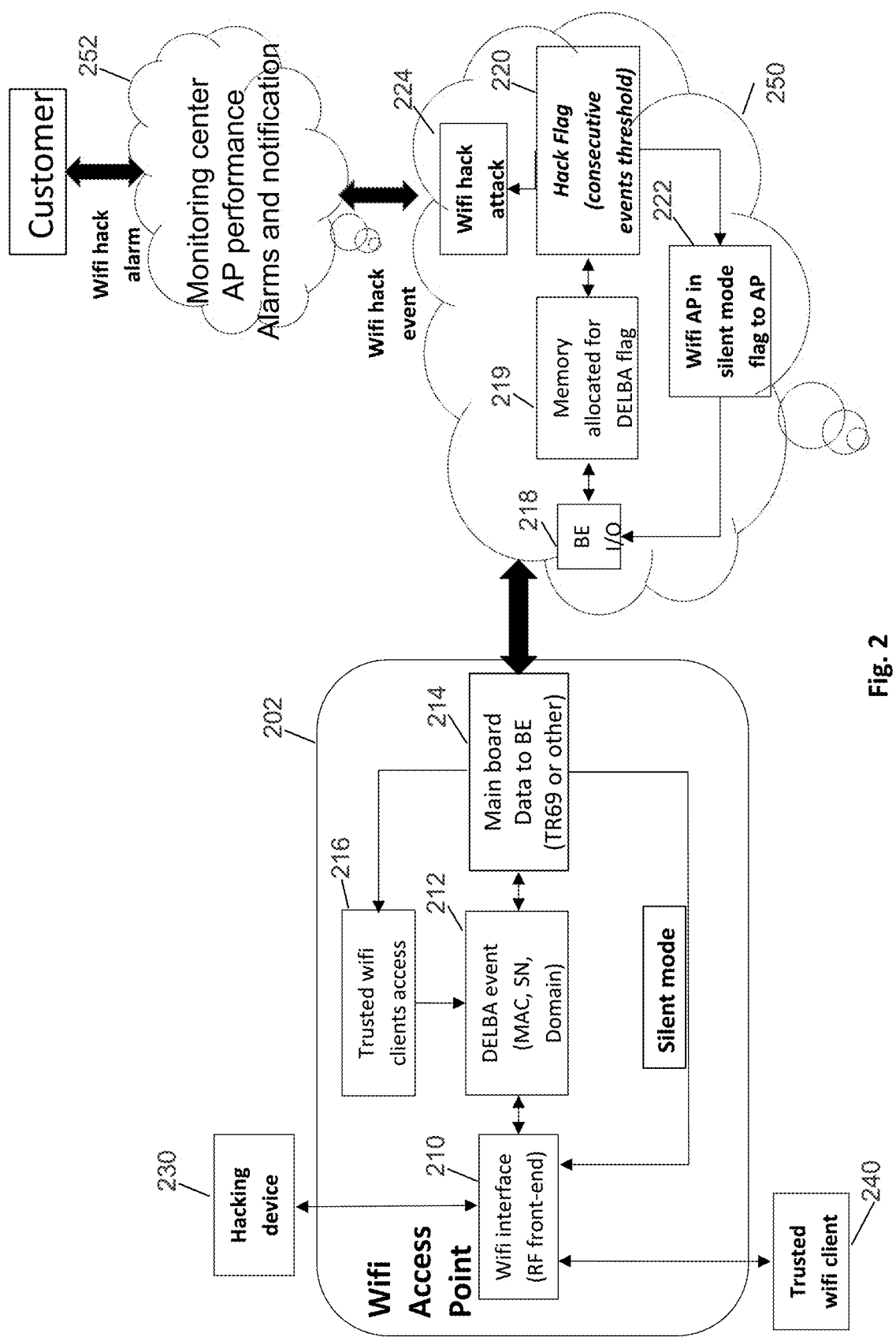
FIG. 2 is a block diagram illustrating exemplary operations of an AP and backend system when the backend system is configured to detect a potential unauthorized access.

FIG. 2 illustrates an implementation where a cloud router determines whether conditions indicate a potential unauthorized access. The AP 202 may communicate with devices 230, 240. In the example illustrated by FIG. 2, device 240 is a trusted Wifi client device and device 230 is a hacking device. The AP 202 also communicates with a backend system 250.

The blocks 210-216 within the AP 202 illustrate operations performed by the AP 202. Each block may correspond to one or more components in the AP 202 and may be implemented in firmware, hardware, software, or any combination thereof. The blocks 218-224 within the backend system 250 illustrate operations performed by the backend system 250. Each block may correspond to one or more components in the backend system 250 and may be implemented in firmware, hardware, software, or any combination thereof.

The AP 202 may include a Wifi interface or RF front end 210 for wirelessly communicating with devices 230, 240, and providing the devices 230, 240 with access to the network. The AP 202 monitors communications received via block 210. When the AP 202 detects a DELBA action frame in block 212, it sends a communication to the backend system 250 in block 214 that indicates a DELBA action frame has been detected. In one implementation, the communication is a TR69 compliant message. The AP 202 also enters silent mode when it detects a DELBA action frame.

The backend system 250 receives the communication from the AP 202 at block 218 via an AP interface and sets a DELBA flag in block 219. If necessary, the backend system 250 may allocate memory for the DELBA flag. The backend system 250 may also maintain a counter of DELBA action frames or flags that is adjusted each time it receives a communication from the AP 202 indicating that a DELBA action frame has been detected. In block 220, the backend system 250 determines whether the number or pattern of DELBA action frames indicates a potential unauthorized access. The backend system 250 may use a threshold of DELBA action frames within a time interval or a pattern of DELBA action frames to detect a potential hacking attack, similar to those discussed above in connection with FIG. 1.

If the backend system 250 detects a potential unauthorized access, then it sets a hack flag in block 220. It also determines that the AP 202 should enter defensive mode in block 222. It sends a message to the AP 202 in block 218 with a flag or other indicator to inform the AP 202 that a potential hacking attack has been detected and/or a command instructing the AP 202 to enter defensive mode. In one example, the message may be a TR69 compliant message.

Upon receiving the message the AP 202 enters defensive mode. In one example, the AP 202 enters silent mode when it detected the DELBA action frame and is still in silent mode when it receives the message from the backend system 250. In this example, the AP 202 remains in silent mode for the defensive time period. In another example, the AP 202 is not in silent mode when it receives the message from the backend system 250. In this example, the AP 202 enters defensive mode and enters silent mode in response to receiving the message from the backend system 250. It remains in silent mode for the defensive time period.

In either example, while in defensive mode the AP 202 may prevent devices 230, 240 from accessing the network or may only allow trusted devices to access the network. The AP 202 may use the MAC address of a device 230, 240 to determine whether the device 230, 240 is a trusted device, as discussed above in connection with FIG. 1.

If the backend system 250 detects a potential unauthorized access, then it may communicate information about the potential unauthorized access to a monitoring center, may generate an alarm or other notification, may notify a customer or other contact associated with the AP 202, or take any other suitable action.

Figure 3:
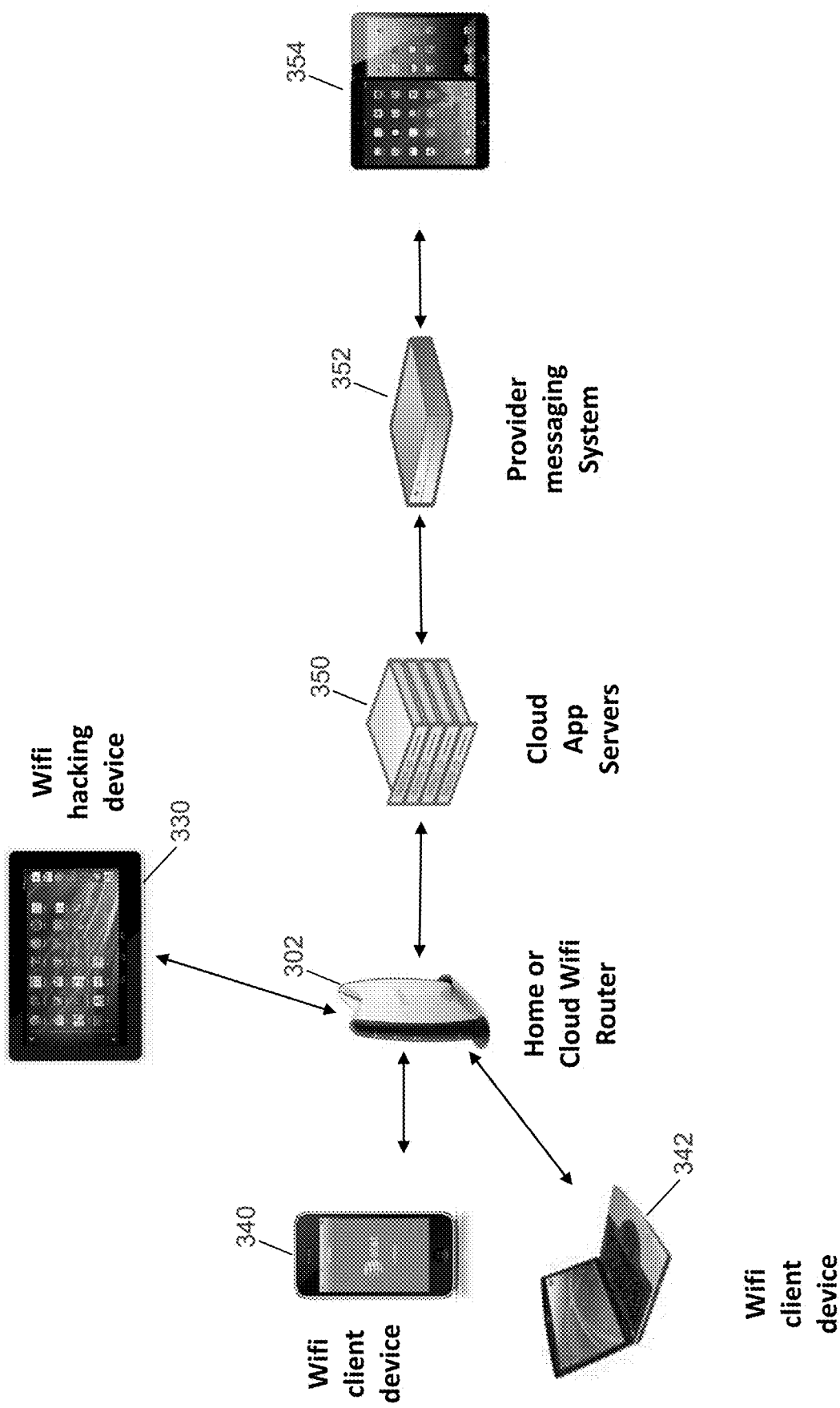
FIG. 3 is a block diagram illustrating an exemplary operating environment for detection and notification of a potential unauthorized access.

FIG. 3 illustrates how notice of the potential unauthorized access may be provided. Once the home or cloud router 302 detects a potential unauthorized access, the router 302 may send a message to a server 350. The server 350 may include or further communicate with a messaging system 352. The messaging system 352 may store information about the router 302, including a customer profile that specifies how to communicate information about a potential unauthorized access. For example, the customer profile may specify that a message or alert should be sent to the customer and/or another listed contact when a potential unauthorized access is detected. The messaging system 352 may send the message or alert in real-time to one or more wireless devices 354. The message may include information about the potential unauthorized access including, but not limited to, the MAC address of the device identified as the potential hacking device.

The server 350 may also include or be connected to a monitoring system. The monitoring system may monitor information about potential unauthorized accesses and may analyze the data to determine whether to adjust any of the factors used to detect a potential unauthorized access. The factors for determining a potential unauthorized access may be adaptive and may use maximum likelihood criteria that depends on the environment, the RF link, patterns and behaviors associated with confirmed hacking attacks, etc. Factors, such as the number of DELBA action frames, the duration of the time interval, the pattern of DELBA action frames, and the defensive time period may be updated based on the information collected by the monitoring system. The monitoring system may send the updated values to the AP 202 or to the server 350 depending upon where the determination of a potential unauthorized access is made. The monitoring system may also modify the actions taken by the AP 202 while in defensive mode by sending a message to the AP 202. For example, the value for the defensive time period or the list of trusted MAC addresses may be updated.

The operations described above may be performed by firmware, hardware, and/or software. In some implementations, the operations are performed by one or more processing devices in the AP 102, 202 or the backend system 250 executing computer readable instructions stored on computer readable media.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. For example, the messages sent between the AP 102, 202 and the backend system 250, are not limited to TR69 compliant messages and may use a different protocol. The illustrative examples described above are given to introduce the reader to the general subject matter discussed here and are not intended to limit the scope of the disclosed concepts.

What is claimed is:

1. A method for managing access to a wireless network, the method comprising:
    receiving, at a wireless access point, a communication from a wireless device;
    processing, by the wireless access point, the communication to determine whether the communication corresponds to a Delete Block Acknowledgement (DELBA) action frame;
    in response to determining that the communication corresponds to a DELBA action frame,
        adjusting, by the wireless access point, a counter of DELBA action frames to account for receipt of the DELBA action frame, wherein the counter of DELBA action frames is maintained by the wireless access point, and
        determining, by the wireless access point, whether a number of DELBA action frames received over a period of time indicated by the counter of DELBA action frames corresponds to a predetermined unauthorized access pattern specifying a threshold number of DELBA action frames received within a predetermined time interval;
    in response to determining that the counter of DELBA action frames corresponds to the predetermined unauthorized access pattern,
        detecting, by the wireless access point, that conditions indicate a potential unauthorized access, and
        moving, by the wireless access point, from operating under normal conditions into a defensive mode, wherein the wireless access point enters a silent mode associated with a default time period while operating under normal conditions and enters a silent mode associated with a defensive time period while operating under the defensive mode, and wherein the default time period of the silent mode while operating under normal conditions is less than the defensive time period of the silent mode while operating under the defensive mode;
    while in the defensive mode, receiving, at the wireless access point, a second communication;
    comparing, by the wireless access point, a Media Access Control (MAC) address associated with the second communication to a list of trusted MAC addresses;
    when the MAC address associated with the second communication corresponds to a MAC address on the list of trusted MAC addresses, allowing, by the wireless access point, access to the wireless network; and
    updating the predetermined unauthorized access pattern with at least one of a different threshold number of DELBA action frames, a pattern of DELBA action frames, or a different defensive time period associated with the silent mode while operating under the defensive mode using maximum likelihood criteria based on patterns and behaviors associated with confirmed unauthorized accesses.

2. The method of claim 1, further comprising when the MAC address associated with the second communication does not correspond to a MAC address on the list of trusted MAC addresses, then denying, by the wireless access point, access to the wireless network.

3. The method of claim 1, further comprising in response to determining that the counter of DELBA action frames does not correspond to the predetermined unauthorized access pattern, configuring, by the wireless access point, to enter into the silent mode associated with the default time period while operating under normal conditions and remain in the silent mode associated with the default time period until the default time period expires.

4. The method of claim 1, further comprising in response to detecting that the conditions indicate a potential unauthorized access, sending a message to a user alerting the user to the potential unauthorized access.

5. A wireless access point comprising:
a wireless interface for communicating with a plurality of wireless devices;
a processing device; and
a memory for storing computer-readable instructions that, when executed by the processing device, cause the wireless access point to perform operations comprising
receiving, via the wireless interface, a communication from a wireless device,
processing the communication to determine whether the communication corresponds to a Delete Block Acknowledgement (DELBA) action frame,
in response to determining that the communication corresponds to a DELBA action frame,
adjusting a counter of DELBA action frames to account for receipt of the DELBA action frame, wherein the counter of DELBA action frames is maintained by the wireless access point, and
determining whether a number of DELBA action frames received over a period of time indicated by the counter of DELBA action frames corresponds to a predetermined unauthorized access pattern specifying a threshold number of DELBA action frames received within a predetermined time interval,
in response to determining that the counter of DELBA action frames corresponds to the predetermined unauthorized access pattern,
detecting that conditions indicate a potential unauthorized access, and
moving from operating under normal conditions into a defensive mode, wherein the wireless access point enters a silent mode associated with a default time period while operating under normal conditions and enters a silent mode associated with a defensive time period while operating under the defensive mode, and wherein the default time period of the silent mode while operating under normal conditions is less than the defensive time period of the silent mode while operating under the defensive mode,
sending a message to a backend system that indicates that a potential unauthorized access is detected,
while in the defensive mode, receiving a second communication via the wireless interface,
comparing a Media Access Control (MAC) address associated with the second communication to a list of trusted MAC addresses,
when the MAC address associated with the second communication corresponds to a MAC address on the list of trusted MAC addresses, allowing access to a wireless network, and
updating the predetermined unauthorized access pattern with at least one of a different threshold number of DELBA action frames, a pattern of DELBA action frames, or a different defensive time period associated with the silent mode while operating under the defensive mode using maximum likelihood criteria based on patterns and behaviors associated with confirmed hacking attacks.

6. The wireless access point of claim 5, wherein the operations further comprise when the MAC address associated with the second communication does not correspond to a MAC address on the list of trusted MAC addresses, denying access to the wireless network.

7. The wireless access point of claim 5, wherein the operations further comprise in response to determining that the counter of DELBA action frames does not correspond to the predetermined unauthorized access pattern, configuring to enter into the silent mode associated with the default time period while operating under normal conditions and remain in the silent mode associated with the default time period until the default time period expires.

8. The wireless access point of claim 5, wherein the operations further comprise receiving at least one of the different threshold number of DELBA action frames, the pattern of DELBA action frames, or the different defensive time period associated with the silent mode while operating under the defensive mode from a server.

9. A server in communication with a wireless access point, the server comprising:
an access point (AP) interface for communicating with the wireless access point;
a processing device; and
a memory for storing computer-readable instructions that, when executed by the processing device, cause the server to perform operations comprising
receiving a communication from the wireless access point via the AP interface, wherein the communication indicates the wireless access point has detected a Delete Block Acknowledgement (DELBA) action frame;
in response to receiving the communication from the wireless access point indicating that a DELBA action frame has been detected,
adjusting a counter of DELBA action frames to account for the DELBA action frame, wherein the counter of DELBA action frames is maintained by the server, and
determining whether a number of DELBA action frames received by the wireless access point over a period of time indicated by the counter of DELBA action frames corresponds to a predetermined unauthorized access pattern specifying a threshold number of DELBA action frames received within a predetermined time interval,
in response to determining that the counter of DELBA action frames corresponds to the predetermined unauthorized access pattern,
detecting that conditions indicate a potential unauthorized access, and
sending a communication to the wireless access point to move from operating under normal conditions into a defensive mode, wherein the wireless access point enters a silent mode associated with a default time period while operating under normal conditions and enters a silent mode associated with a defensive time period while operating under the defensive mode, wherein the default time period of the silent mode while operating under normal conditions is less than the defensive time period of the silent mode while operating under the defensive mode, and wherein the wireless access point, while in the defensive mode, receives a communication via a wireless interface, compares a Media Access Control (MAC) address associated with the communication to a list of trusted MAC addresses, and when the MAC address associated with the communication corresponds to a MAC address on the list of trusted MAC addresses, allows access to a wireless network, initiating a message to a user system providing notice of the potential unauthorized access, and updating the predetermined unauthorized access pattern with at least one of a different threshold number of DELBA action frames, a pattern of DELBA action frames, and a different defensive time period associated with the silent mode while operating under the defensive mode using maximum likelihood criteria based on patterns and behaviors associated with confirmed hacking attacks.

10. The server of claim 9, wherein sending the communication to the wireless access point to enter the defensive mode includes sending a value for the defensive time period.

\* \* \* \* \*